(12) United States Patent
Wirth et al.

(10) Patent No.: US 6,328,838 B1
(45) Date of Patent: Dec. 11, 2001

(54) CONFORMAL DEPOSITION OF THIN MEMBRANES ON IRREGULARLY-SHAPED SURFACES

(75) Inventors: Reinhold Franz Wirth, Ballston Spa; Stanley Joseph Lubowski, Scotia, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/330,642

(22) Filed: Oct. 28, 1994

Related U.S. Application Data

(63) Continuation-in-part of application No. 08/084,111, filed on Jul. 1, 1993.

(51) Int. Cl.[7] ................................................. B29C 65/00
(52) U.S. Cl. .......................... 156/212; 156/214; 156/286; 264/511
(58) Field of Search ..................................... 156/212, 285, 156/286, 382, 214; 264/511, 510

(56) References Cited

U.S. PATENT DOCUMENTS 3,398,811 * 8/1968 Muller ................................. 156/212
4,398,118 * 8/1983 Galves et al. ....................... 313/527

* cited by examiner

*Primary Examiner*—Michael W. Ball
*Assistant Examiner*—Gladys Piazza
(74) *Attorney, Agent, or Firm*—Donald S. Ingraham; Christian G. Cabou

(57) ABSTRACT

A method of depositing a thin membrane so that it conforms to an irregular shaped surface of a scintillator includes the steps of aligning the membrane in a desired position with respect to the irregular surface so that the membrane is in contact with at least some protruding portions of the scintillator, and drawing the membrane down over the irregular surface so that the membrane is conformingly disposed around substantially all protrusions without deforming or bending the needle-like protrusions. The membrane is drawn down by applying a substantially uniform differential pressure across the thin membrane so as to urge the membrane into conformal contact with irregular surface. An imager array fabricated with this process includes a scintillator having an irregular surface and a monolithic reflective layer disposed thereover in conformal contact with the irregular surface.

10 Claims, 3 Drawing Sheets

CONFORMAL DEPOSITION OF THIN MEMBRANES ON IRREGULARLY-SHAPED SURFACES

RELATED APPLICATIONS

This application is a continuation-in-part of application Ser. No. 08/084,111, filed Jul. 1, 1993, and is related to the application by the inventors herein entitled "Fabrication Chuck", Ser. No. 08/084,115, filed Jul. 1, 1993, and which is assigned to the assignee of the present invention and is incorporated herein by reference.

BACKGROUND OF THE INVENTION

In a number of devices, such as radiation imagers, it is desirable to apply a thin membrane to an irregularly shaped surface. For example, in a radiation imager in which a scintillator is optically coupled to a photosensor, it is desirable to apply a layer of reflective material to the surface of the scintillator opposite the surface adjoining the photodetector so that optical photons generated in the scintillator are reflected towards the photosensor. Commonly, one surface of the scintillator is irregularly shaped, that is, protrusions extend from the surface so that the surface is not flat. Such protrusions are needle or pyramid-like structures that result from the deposition process and serve to localize detection of photons generated in the array to the area in which the incident radiation was absorbed in the scintillator.

Application of reflective coatings to the irregular surface of the scintillator poses a number of difficulties. Many scintillator materials, such as cesium iodide, have large thermal expansion coefficients and thus are extremely sensitive to processes in which a reflective coating is deposited onto the surface, such as by sputtering. The relatively high temperatures associated with such deposition processes (e.g., above about 300°–400° C.) cause degradation of the scintillator material that and the overlying reflective material, resulting in much degraded performance of the scintillator. Traditional techniques of mechanically applying a coating, such as pulling a coating sheet across the surface to be covered, or mechanically pressing a coating onto the surface from above, cannot be used because of the malleable nature of cesium iodide. Specifically, the cesium iodide needle structure (on the light-receiving side of the scintillator) is deformed by such conventional processes, resulting in a distortion of the needle structure, causing light traveling through the structure to strike the interior surface boundaries of the needle many thousand more times before the right emerges from the scintillator into the detector array. Deformation of the needle structure as results from conventional cover application processes result in degraded imager performance (as measured, for example, by the imager's modulation transfer function (MTF)). Further, most conventional mechanical cover application processes do not provide for the evacuation of air that may be trapped between the scintillator surface and the cover material; such trapped air further degrades the optical performance of the scintillator.

A reflective coating on a scintillator surface desirably conforms to the irregular shape of the scintillator so that optical photons are directly coupled between the reflective layer and the scintillator material, with few it any interstitial voids between the scintillator material and the reflective material. Additionally, the application of the reflective material should not degrade the scintillator structure, either by thermally degrading the material or mechanically deforming the needle or pyramid-like structure of the scintillator. Reflective materials having the desired optical and physical characteristics are available in monolithic thin membranes (as used herein, "monolithic" refers to a substantially uniform material in a sheet-like form), however application of such thin membranes to the irregular shaped surfaces of a scintillator without damaging the scintillator or the thin membrane has been problematic.

One object of this invention is to provide a method for applying a thin membrane over a scintillator on a radiation imager, including precisely aligning the membrane with the surface and causing the membrane to be conformingly disposed over the needle-like structures of the scintillator without causing deformation or lateral movement of the needle-like structures.

SUMMARY OF THE INVENTION

In accordance with this invention, a method of depositing a thin pliant membrane to be in conformal contact with light-receiving surface of a scintillator having a plurality of needle-like protrusions (comprising a malleable scintillator material) includes the steps of precisely positioning a coupling surface of the membrane with respect to the scintillator light-receiving surface so that the coupling surface is in contact with at least some of the needle-like protrusions without causing deformation of the protrusions and then drawing the membrane down over the light receiving surface so that the membrane is conformingly-disposed over around substantially all of the protrusions from the scintillator light-receiving surface without distorting the shape of the protrusions. The step of drawing the membrane down around the light receiving surface includes the step of applying a substantially uniform differential pressure across the pliant membrane so as to urge the membrane in to conformal contact with the light receiving surface, such as by placing the scintillator assembly on a vacuum bed, disposing a vacuum blanket over the pliant membrane and the scintillator to form a sealed area between the blanket and the vacuum bed, and drawing a vacuum in the sealed area so as to evacuate air between the membrane and the scintillator surface and to cause the blanket to urge the membrane into conformal contact with the scintillator surface.

The step of precisely positioning the thin membrane in the desired position with respect to the scintillator surface includes the steps of retaining the pliant membrane on an applicator by means of a differential pressure which keeps the thin membrane seated against a mating surface of the applicator such that the membrane is maintained in a relatively flat condition; positioning the applicator with respect to the workpiece so as to dispose the membrane in the desired position; and then releasing the thin membrane from the applicator.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
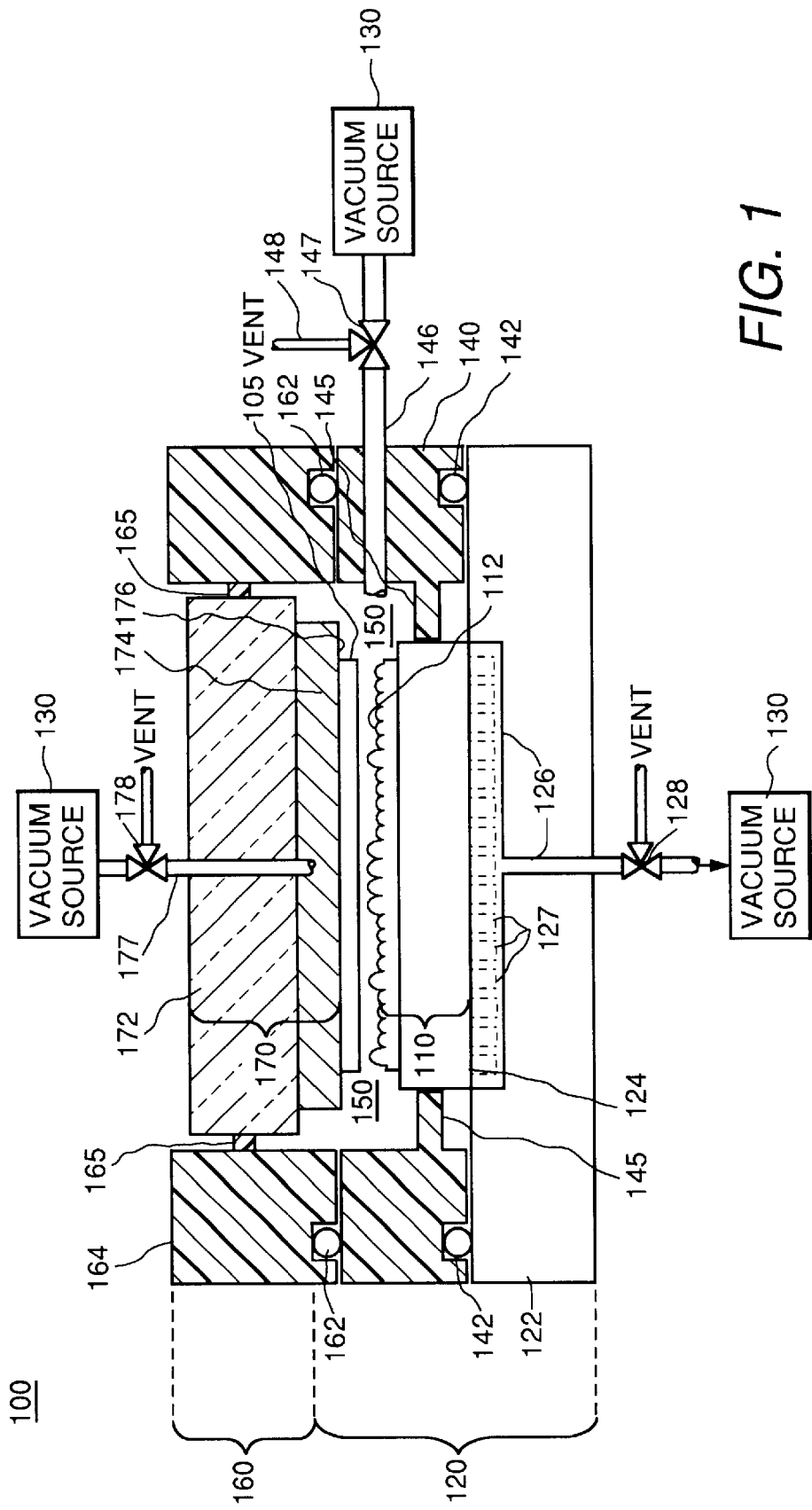
FIG. 1 is a cross-sectional diagram of a fabrication chuck used in the method of the present invention to conformingly deposit a thin membrane over irregular surface features of a workpiece.

A fabrication chuck 100 as illustrated in FIG. 1 is advantageously used in the fabrication process of the present invention and is referred to in the discussion of the invention below. Fabrication chuck 100 comprises a foundation 120 and an upper chuck assembly 160, which is detachably coupled to foundation 120. In accordance with this invention a relatively thin pliant membrane 105 can be disposed on an irregular surface 112 of a workpiece 110 so as to conform to the irregular shape of the surface. As used herein, "membrane" refers to porous and non-porous materials that are typically monolithic, that is in substantially one piece, such as a sheet of material, and that are typically pliant (that is, comprise one or more layers of material that can be molded or deformed to conform to the contours of an underlying surface); "thin" refers to materials having a thickness of between about 0.0005" and 0.060"; "irregular surface" refers to a surface having protrusions extending therefrom (alternatively, the surface may be thought of as having depressions therein) such that it is not smooth; "workpiece" refers generally to the device having the surface to which the membrane is to be applied, and typically, in the context of this invention, refers to an imager array having a scintillator on which membrane 105 is to be applied; and "conformingly dispose" and the like refers to the deposition of material around the protuberances (or depressions) in the surface such that the applied material is in substantially immediate contact with at least a desired portion of the irregular surface so that there are substantially no interstitial voids between the surface and the applied material (e.g., pockets of trapped air) and such that the protuberances are not deformed (or bent) (whereby the shape of the protuberances, or needle-like protrusions from the scintillator surface, is maintained so that the optical performance of the scintillator is not degraded).

Irregular surface 112 of workpiece 110 typically comprises a malleable scintillator material such as cesium iodide having needle-like (or pyramid-like) protrusions extending from the surface. The malleable nature of cesium iodide is such that the shape of the needle-like protrusions is readily distorted, such as by bending, in response to a lateral force, as commonly occurs in conventional methods of applying coverings. The needles can also be distorted (resulting in bending) by compression if too much force is used in applying membrane 105. The malleable nature of cesium iodide is evidenced by a number of physical characteristics (as reported in Scintillation Detectors: A Reference Guide published by Harshaw Scintillation Detectors), such as cubic-face centered crystal structure with no cleavage plane. Cesium iodide further has a Youngs modulus (expressed in $10^{10}$ N/m$^2$) for flexure in the range between 0.53 and 1.8, and an average tension/compression value of 1.2; this material also exhibits considerable plastic flow.

Foundation 120 comprises a base 122 that is adapted such that a vacuum can be drawn on workpiece 110 to hold it firmly disposed on an interior surface 124 of base 122. For example, vacuum piping (or plumbing) 126 is disposed in base 122 and coupled to orifices 127 on interior surface 124 and coupled via a control valve 128 to a vacuum source 130. Control valve 128 typically comprises a 3-way valve that is also coupled to a vent disposed in plumbing 126 to allow equalization of pressure across workpiece 110 when desired. Alternatively, two separate valves, one for coupling to the vacuum source, and one for venting, can be used.

As illustrated in FIG. 1, foundation 120 further comprises a registration assembly 140 that is detachably coupled to base 122, for example by fasteners such as latches, clamps, screws, bolts and nuts, or the like (not shown) such that it is removable from base 122 but can be firmly attached to base 122. A seal 142, such as an O-ring, is disposed between registration assembly 140 and base 122 such that, when coupled together, the base and the registration assembly are hermetically joined. As used herein, "hermetically joined", "hermetically sealed" or the like refers to a seal that is substantially air-tight and allows a differential pressure to be generated across the sealed boundary.

Registration assembly 140 further comprises registration guides 145 which are adapted to align workpiece 110 in a selected position with respect to base 122 and consequently with respect to upper chuck assembly 160, on which thin membrane 105 is disposed as described more fully below. As illustrated in FIG. 1, registration guides 145 comprise fingers extending from registration assembly 140; alternatively the registration scheme may comprise grooves or indentations in registration assembly 140 adapted to receive and align workpiece 110 in a desired fabrication position, that is the position on interior surface 124 in which the workpiece is situated to receive the thin membrane from applicator an 170 as described more fully below.

In accordance with this invention, base 122 is adapted such that different registration assemblies 140 can be attached (one at a time) to the base, thus allowing registration assemblies tailored for alignment of different size workpieces to be respectively attached to base 122. Alternatively, base 122 and registration assembly 140 may comprise a single assembly (that is, registration assembly 140 is not detachable from base 122).

Registration assembly typically further comprises vacuum port 146 coupled to vacuum source 130 via a control valve-regulator 147, which valve-regulator is adjusted to maintain chamber 150 at a higher pressure than the vacuum applied to maintain workpiece 110 in place and the vacuum applied to maintain membrane 105 in place; regulator 147 is further adapted to be coupled to a vent port 148 so as to equalize pressure across the walls of registration assembly 140. Two separate valves can be used in lieu of a 3-way valve. Vacuum source 130 comprises a vacuum pump or the like, with the amount of vacuum available being design considerations dependent on the size of the fabrication chuck; for a fabrication chuck for applying optical cladding layers to a scintillator as described herein, a vacuum source providing up to about 30" Hg (and commonly about 20" Hg) is satisfactory.

Upper chuck assembly 160 is adapted to be hermetically sealed to registration assembly 140 so as to form an assembly chamber 150 therebetween. A seal 162, such as an O-ring, is disposed between upper chuck assembly 160 and registration assembly 140 to hermetically seal the juncture where the two assemblies are joined together.

Upper chuck assembly 160 comprises a frame 164 and an applicator 170 positioned within frame 164 by means of a flexible joint 165 such that applicator 170 is adapted to be selectively displaced towards workpiece 110 in assembly chamber 150. Upper chuck assembly 160 is adapted so that displacement of applicator towards workpiece 110 is along a predetermined axis so that thin membrane 105 is precisely positioned with respect to the irregularly-shaped surface of workpiece 110. The precise positioning includes both lateral alignment of membrane 105 with respect to surface 112 and vertical alignment with respect to surface 112. As used herein, "lateral alignment" refers to the positioning of the thin membrane over the workpiece such that it is aligned with respect to the workpiece in the plane of the membrane/ workpiece; "vertical alignment" refers to distance between the respective planes of surface 112 and membrane 105, that is, membrane 105 is positioned so that a coupling surface 106 of membrane 105 is disposed in contact with at least some protuberances (needle-like structures extending from surface 112) without deforming (or bending) the needles. The precise positioning is possible because workpiece 110 is disposed in a known, selected position with respect to applicator 170 when it is positioned in registration assembly 140 and upper chuck assembly 160 is fastened to foundation 120 to form the fabrication chuck. Flexible joints 165 are adapted to allow movement of applicator 170 along the sidewalls of frame 164 so that the alignment of the applicator within frame 164 is maintained.

Applicator 170 comprises a vacuum chuck 172 having a mating surface 174 disposed facing assembly chamber 150. Mating surface 174 typically comprises a layer of sintered material, such as stainless steel, a composite, or the like, with a smooth planar surface 176. As used herein, "sintered material" refers to a smooth-faced material having fine pores therein to allow the passage of gas therethrough; the size of the pores can range between 0.5 $\mu$m and 100 $\mu$m, although typically the pore size is about 10 $\mu$m or less.

Upper chuck assembly 160 further comprises vacuum plumbing 177 connected to vacuum source 130 via a control valve 178 (typically comprising a 3-way valve) and adapted to generate a differential pressure by taking a suction through the sintered material comprising mating surface 174. Control valve 178 is further connected to vent plumbing 179 to allow equalization of pressure across mating surface 176. Applicator 170 typically comprises a substantially transparent material such as a polymer or the like to allow visual inspection of the assembly chamber. Alternatively or additionally, viewing ports are disposed in foundation 120 and upper chuck assembly 160 to allow visual determination of the position of applicator 170 with respect to workpiece 110.

Figure 2A:
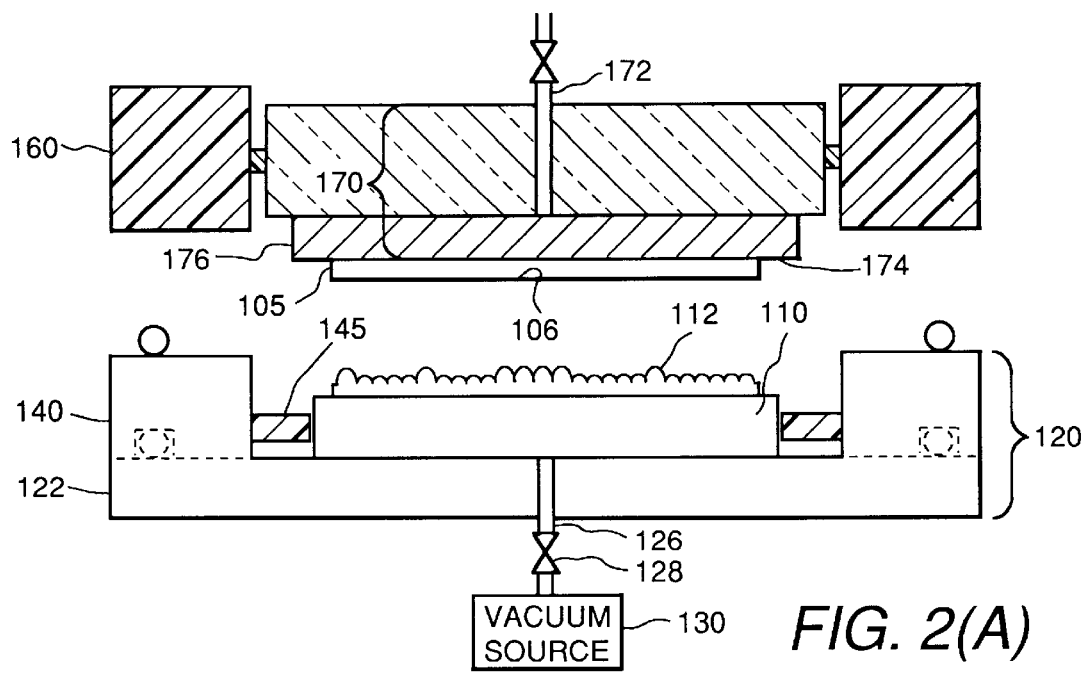
FIGS. 2(A)–2(C) are cross-sectional views illustrating certain steps in the fabrication process of the present invention.
Figure 2B:
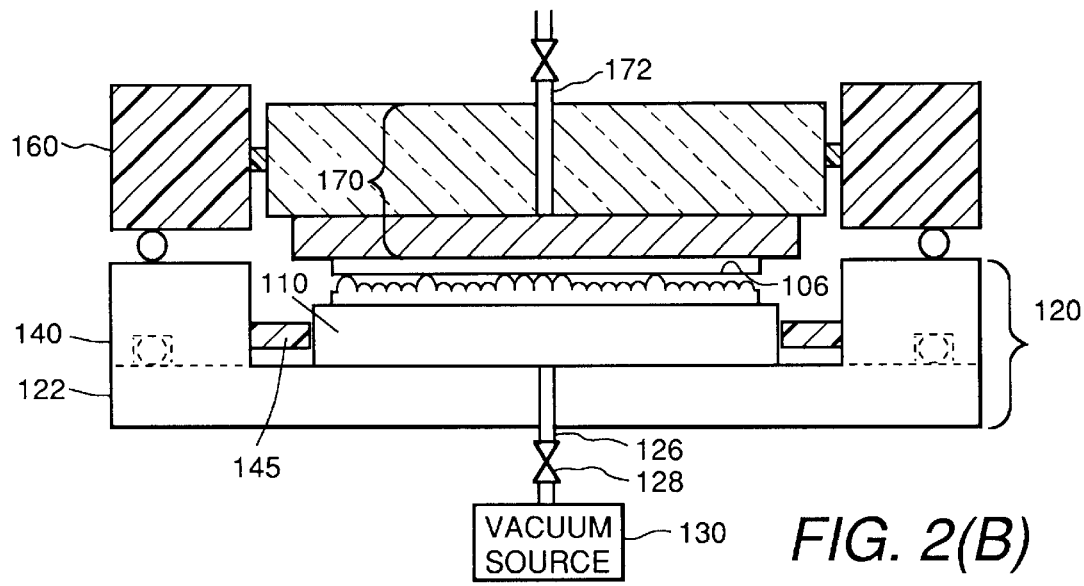
Figure 2C:
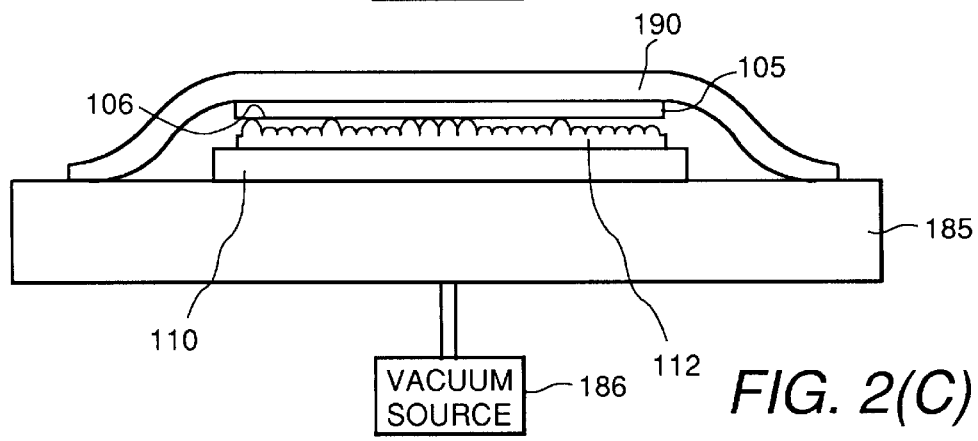

In accordance with the method of this invention and as illustrated in FIGS. 2(A)–2(C), thin membrane 105 is applied to irregular surface 112 of workpiece (e.g., imager array with scintillator) 110 as set out below. A registration assembly appropriate for the workpiece to be processed is selected and coupled to base 122 to form foundation 120 having the desired alignment dimensions. Workpiece 110 fits in registration assembly 140 such that it is disposed in a selected position in the foundation. For example, registration assembly 140 is selected such that registration guides 145 are disposed to align workpiece 110 in the selected position in the foundation, typically substantially centered on the face of interior surface 124 of base 122 on which it rests and such that irregular surface 112 is disposed in a position so that pliant membrane 105 can be disposed thereon.

Workpiece 120 typically comprises an imager array having a substrate with a photosensor array and a scintillator disposed thereover. Irregular surface 112 of the scintillator typically comprises a number of needles or pyramid-like protrusions from the surface over which it is desired to deposit a conformal reflective layer. Thin membrane 105, such as a thin film of reflective material or the like, is shaped into a monolithic sheet of material having dimensions substantially corresponding to the dimensions of the area of irregular surface 112 to which it is to be applied. Thin membrane 105 typically comprises a sheet of material that is disposed over smooth planar surface 176 of mating surface 174 and aligned in correspondence with registration guides so as to have a desired alignment with respect to workpiece 110 when the upper chuck assembly 160 is coupled to foundation 120.

In accordance with this invention, thin sheet 105 is held in the desired alignment with respect to mating surface 174 by generating a differential pressure across the thin membrane so that it is held on smooth planar surface 176. For example, vacuum plumbing 177 is coupled to vacuum source 130 so as to evacuate mating surface 174 and thereby allow ambient pressure to hold thin membrane 105 against mating surface 174. As the pores in the sintered material comprising mating surface 174 are relatively small (e.g., between about 0.5 $\mu$m and 10 $\mu$m), thin membrane 105 maintains a relatively flat shape, that is, the differential pressure across the thin membrane is relatively uniform and the thin membrane is not deformed.

In imager array fabrication, thin membrane 105 typically comprises an optical reflector to be applied to irregular surface 112 of the scintillator material on the array. The multilayer optical reflector comprising thin membrane 105 typically comprises coupling layer 106 comprising an adhesive and typically further comprising a diffuse reflective material (which is disposed away from mating surface 174) and a spicular optical reflecting layer. One example of such a material (known as "Optic lad") has an adhesive layer with titanium oxide mixed therein to provide a diffuse reflector and a specular reflector, such as silver, gold, or the like, on a plastic backing, and which is described more fully in U.S. Pat. No. 4,720,426 of Englert et al., which is assigned to the assignee of the present invention and is incorporated herein by reference. The adhesive and diffuse reflecting material of coupling layer 106 is readily deformed by contact with irregular shaped surface 112 such that it spreads out and around the needle-like protrusions of surface 112 without distorting the shape of the needles. The thickness of the adhesive/diffuse reflector layer in Opticlad is about 5 $\mu$m and the silver and plastic reflector layer has a thickness of about 2 mils.

Upper chuck assembly is disposed in foundation 120 so as to form assembly chamber 150 therebetween, for example as illustrated in FIG. 1. Flexible joints 165 are adapted to hermetically seal assembly chamber 150 and to allow applicator 170 to be displaced towards (and away from) workpiece 110. In accordance with this invention, applicator 170 is selectively displaced such that thin membrane 105 is precisely positioned with respect to irregular surface 112 of workpiece 110 (that is, thin membrane 105 is positioned in lateral alignment with workpiece 110 and so that coupling surface 106 are disposed in physical contact with at least some of the protrusions from the irregular surface of workpiece surface 112, without causing damage or deformation of such protrusions, and so that the thin membrane is in a position to be drawn into conformal contact with the irregular surface in accordance with this invention as described below. The precise lateral alignment further allows the application of a thin membrane having a tacky or adhesive surface that will begin to bond to the workpiece when it comes in contact with the surface (the tacky surface makes it impractical to move the thin membrane laterally across the workpiece surface after initial contact between the membrane and the workpiece is made).

Displacement of applicator 170 is typically controlled by applying a differential pressure across the applicator, for example by lowering the pressure in assembly chamber 150 by selectively controlling vacuum control valve 147 in vacuum piping 146 coupled to vacuum source 130 (FIG. 1). The differential pressure causes displacement of applicator 170 towards workpiece 110 to allow disposing thin membrane in the desired position with workpiece 110, as illustrated in FIG. 2(B). Alternatively, pneumatic devices (such as pistons coupled to the applicator), electrical devices (such as electromechanical motor/operator arrangements) or manual displacement can be used. Determination of placement of thin membrane 110 in the desired position may be made visually, for example by viewing the applicator and workpiece through substantially transparent portions of the fabrication chuck assembly; alternatively other optical (e.g., a laser alignment system) or electrical sensors can be used to assist in disposing the thin membrane in the desired position.

After thin membrane 105 is disposed in the desired position on irregular surface 112 of workpiece 110, it is released from mating surface 174 by equalizing the pressure across the thin membrane such that it is no longer held against mating surface 174. The differential pressure disposing applicator 170 towards workpiece 110 is released and applicator is then moved away from workpiece 110 and can be removed from foundation 120, the motive force for such movement being pneumatic, electrical, manual, or the like. The entire upper chuck assembly 160 can be removed from foundation 120.

Next, as illustrated in FIG. 2(C), workpiece 110 is disposed on a vacuum bed 185 and a vacuum blanket 190 is disposed over workpiece 110 (including over membrane 105 disposed on irregularly-shaped surface 112 of the scintillator) so as to form a sealed area encompassing workpiece 110. A vacuum is then drawn on vacuum bed 185 so that air in the sealed area under vacuum blanket 190 is evacuated. This evacuation of air removes air (or other ambient gas) from the area between scintillator surface 112 and membrane 105 (thus eliminating trapped pockets of air between the two) and also serves to create a differential pressure across vacuum blanket 190 and membrane 105 so as to draw pliant membrane 105 down around the needle like structures of surface 112 so that the membrane is in conformal contact with irregular surface 112 of workpiece 110. As used herein, "drawn down" refers to causing the thin membrane to partially deform around protrusions extending from irregular surface 112 such that the membrane material substantially conforms to the irregular features of the surface without deforming or bending the needle-like protrusions from surface 112 (e.g., the shape of the needle-like structures is not distorted). The application of the differential pressure across thin membrane 105 is controlled so as to urge membrane 105 into conformal contact with irregular surface 112. Protective blanket 190 is adapted to transfer the applied differential pressure such that the pressure is applied to thin membrane substantially uniformly to enhance conforming thin membrane 105 to the irregular surface.

As noted above, thin membrane 105, such as an optical cladding used on a scintillator, typically comprises coupling layer 106 disposed toward the irregular surface so that thin membrane bonds to the irregular surface. After thin membrane is drawn into conformal contact with the irregular surface of workpiece 110, protective blanket 190 is removed and the workpiece is further processed to allow curing of the thin membrane adhesive and application of other components. In the case of imagers, such as radiation imagers, such further components may include protective sheets of aluminum or the like disposed over the array as a sealant layer to provide additional protection to the array, such as to seal it from moisture or damage from physical handling. The fabrication chuck and method in accordance with this invention can similarly be used for application of such components.

Figure 3:
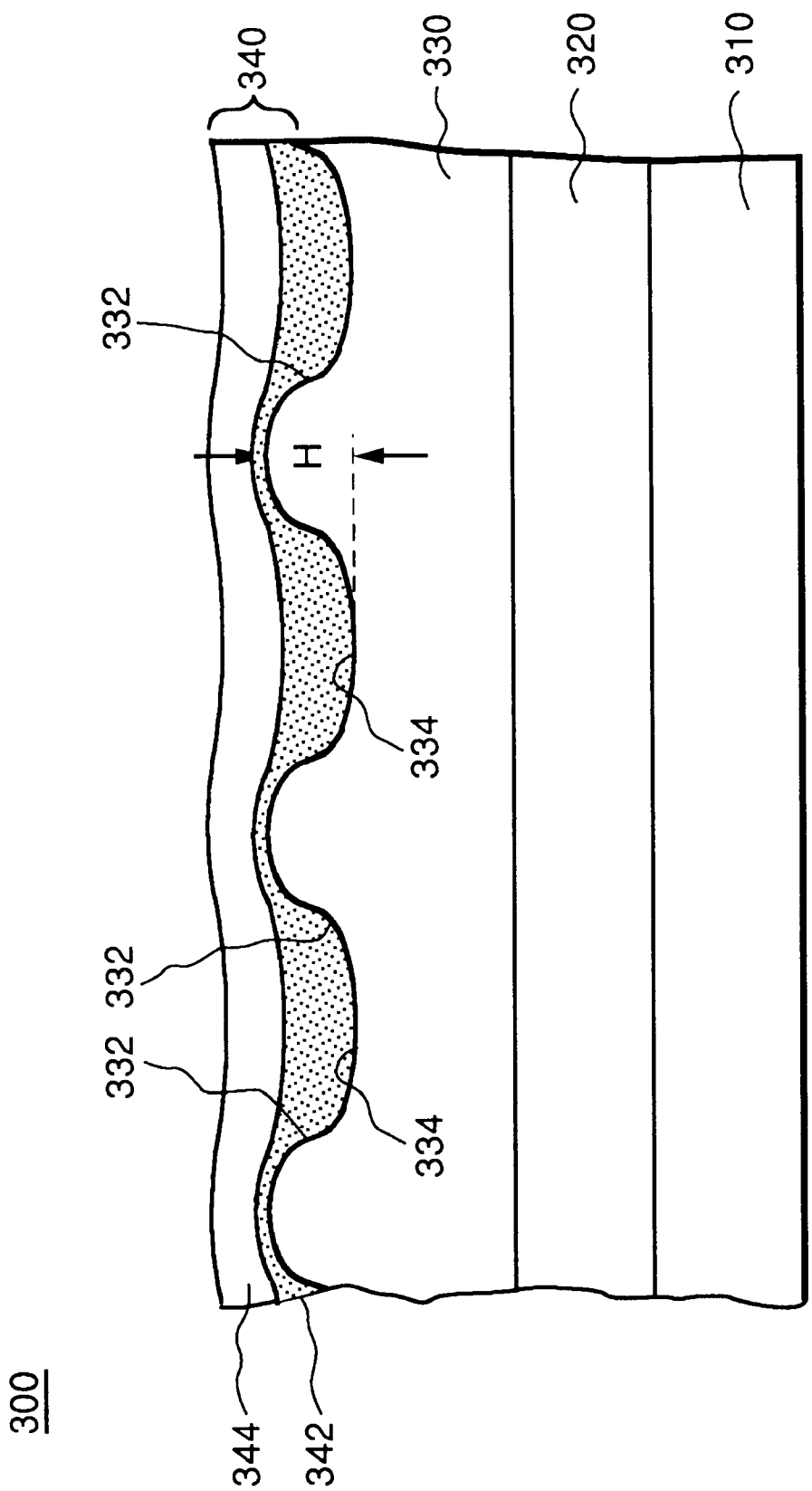
FIG. 3 is a schematic diagram of a representative portion of a radiation imager array fabricated in accordance with the present invention.

A cross-section of a representative portion of a radiation imager array 300 fabricated in accordance with this invention is illustrated in FIG. 3. Array 300 comprises a substrate 310 and a photosensor array 320 disposed thereover. Photosensor array 320 typically comprises photodiodes or the like coupled to address lines and switching devices, such as thin film transistors, to provide the desired array photosensing capabilities. A scintillator 330 is disposed over photosensor array has an irregular surface with a plurality of protrusions 332 extending from an upper surface 334 of scintillator 330. Protrusions 332 have a needle-like or pyramid-like shape, with a height "H" above surface 334 in the range between about 2 $\mu$m and 5 $\mu$m. Scintillator 330 typically comprises a material such as cesium iodide, sodium iodide or the like; typical dopants in the scintillator material include thallium, sodium, or the like.

In accordance with this invention, a thin membrane reflective layer 340 comprising a monolithic sheet of material is conformingly disposed over upper surface of scintillator 330. Reflective material comprises an adhesive layer 342 and an reflective layer 344. Adhesive layer 342 further comprises diffuse reflecting material, such as titanium oxide powder spread therethrough to a selected concentration to enhance the reflection of optical photons emerging from scintillator surface 334 back into the scintillator material. Adhesive layer 342 is disposed in substantially intimate contact with upper surface 334 of scintillator 330 such that essentially no interstitial voids exist between scintillator protrusions 332 and reflective layer 340 such that good optical coupling is achieved therebetween so as to effectively optically isolate each pinnacle or pyramid (thereby minimizing the transmission of light between the pinnacles). Dependent on the thickness and malleability of adhesive layer 342, and the height "H" of protrusions 332, reflective layer 340 is disposed in intimate contact with substantially the entire upper surface 334 of scintillator 330, as illustrated in FIG. 3. For example, in accordance with this invention a thin membrane reflective layer having an adhesive layer thickness of about 5 $\mu$m conforms to the entire upper surface of a scintillator having needle protrusion heights of 5 $\mu$m or less. In scintillator devices it is desirable that the optically coupling material (such as the adhesive/diffuse reflector layer described herein) cover the entire topography of the irregular surface; in other devices, such complete conformal coverage may not be critical and the thin membrane can be disposed over the irregularly shaped surface so as to cover only an upper portion of the protrusions.

Imager arrays having a thin membrane optical reflecting layer conforming to the irregular surface of the scintillator in accordance with this invention exhibit improved performance over scintillators having no reflective coating or a reflective coating that is deposited directly on the scintillator by a method such as sputtering or the like. For example, an array fabricated in accordance with this invention has been shown to detect in the photosensor array about 80% of the total number of optical photons generated in the scintillator (as compared with an optimal collection of about 50% of total photons generated in a device having a scintillator without a reflective coating).

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of depositing a thin pliant membrane to be in conformal contact with a light-receiving surface of a scintillator having a plurality of malleable needle-shaped protrusions extending therefrom, comprising the steps of:

precisely positioning a coupling surface of said membrane in a desired position with respect to said light receiving surface such that the membrane coupling surface is disposed in contact with at least some of said needle-shaped protrusions without causing deformation of said protrusions; and drawing said membrane down over said scintillator light receiving surface such that portions of said membrane are conformingly disposed around substantially all of said protrusions on said scintillator light-receiving surface without distorting the shape of said protrusions;

the step of drawing said membrane down over said scintillator further comprising the step of applying a substantially uniform differential pressure across said pliant membrane so as to urge said membrane into conformal contact with said light-receiving surface such that said membrane partially deforms around said needle-shaped protrusions to be in intimate contact around each of the malleable needle-shaped protrusions on said light-receiving surface of said scintillator.

2. The method of claim 1 wherein the step of drawing said membrane down over said scintillator further comprises the step of evacuating air remaining between said light-receiving surface of said scintillator and said pliant membrane disposed thereover such that when said membrane is disposed in conformal contact with said light receiving surface such that substantially no air is trapped therebetween.

3. The method of claim 2 wherein the step of drawing said membrane down over said scintillator further comprises the steps of disposing said scintillator over a vacuum bed, disposing a vacuum blanket over such that it extends across said pliant membrane and is disposed in contact with portions of said vacuum bed so as to form a sealed area encompassing said scintillator, and drawing a vacuum through said vacuum bed to evacuate air from said sealed area and to generate a substantially uniform differential pressure across said vacuum blanket so as to urge said pliant membrane into conformal contact with said light-receiving surface of said scintillator.

4. The method of claim 1 wherein the step of precisely positioning said membrane in a desired position comprises the steps of:

retaining said pliant membrane on an applicator, said applicator being adapted to maintain a differential pressure across said membrane such that said membrane maintains a relatively flat shape while retained on said applicator; and positioning said applicator with respect to said scintillator light-receiving surface so as to dispose said membrane in said desired position with a selected lateral alignment of said thin membrane with respect to said scintillator light-receiving surface; and releasing said thin membrane from said applicator.

5. The method of claim 4 wherein the step of retaining said thin membrane on said applicator further comprises the steps of:

disposing said membrane on a mating surface of said applicator, and drawing a vacuum in said applicator such that differential pressure seats said membrane against said mating surface, the differential pressure holding said membrane relatively flat against said applicator.

6. The method of claim 5 wherein the step of positioning said applicator with respect to said scintillator light-receiving surface so as to dispose said thin membrane in said desired position comprises the steps of:

hermetically coupling said applicator to a foundation piece so as to form an assembly chamber, said foundation piece being adapted to hold said work piece in a selected position, said applicator being registered with respect to said foundation piece such that said membrane is selectively aligned with said workpiece; and displacing said mating surface of said applicator in said assembly chamber so as to dispose said thin membrane in said desired position.

7. The method of claim 6 wherein the step of displacing said mating surface of said applicator in said assembly chamber further comprises the step of evacuating said chamber so as to generate a differential pressure on said applicator such that said mating surface is urged towards said scintillator in correspondence with the selective alignment such that said pliant membrane is precisely positioned with respect to said light receiving surface of said scintillator.

8. The method of claim 1 wherein said scintillator comprises cesium iodide.

9. The method of claim 8 wherein said pliant membrane comprises a reflective coating material having an adhesive layer and a reflective layer, said adhesive layer forming said coupling surface disposed towards said light-receiving surface of said scintillator.

10. The method of claim 9 wherein said adhesive layer further comprises a diffuse reflecting material.

* * * * *